United States Patent [19]
Goodwin

[11] Patent Number: 5,980,990
[45] Date of Patent: *Nov. 9, 1999

[54] WATER REPELLENT SURFACE TREATMENT WITH ACID ACTIVATION

[75] Inventor: George B. Goodwin, Cranberry Township, Pa.

[73] Assignee: PPG Industries Ohio, Inc., Cleveland, Ohio

[*] Notice: This patent is subject to a terminal disclaimer.

[21] Appl. No.: 08/985,554

[22] Filed: Dec. 5, 1997

Related U.S. Application Data

[60] Division of application No. 08/660,352, Jun. 7, 1996, Pat. No. 5,707,740, which is a continuation-in-part of application No. 08/461,464, Jun. 5, 1995, abandoned, which is a continuation-in-part of application No. 08/363,803, Dec. 27, 1994, Pat. No. 5,523,161, which is a continuation-in-part of application No. 08/220,353, Mar. 30, 1994, abandoned, which is a continuation-in-part of application No. 07/589,235, Sep. 28, 1990, Pat. No. 5,308,705, which is a continuation-in-part of application No. 07/503,587, Apr. 3, 1990, Pat. No. 4,983,459.

[51] Int. Cl.$^6$ ...................................................... B05D 3/04
[52] U.S. Cl. ......................... 427/309; 427/299; 427/327
[58] Field of Search .................................. 427/299, 309, 427/327

[56] References Cited

U.S. PATENT DOCUMENTS

| | | |
|---|---|---|
| 2,526,431 | 10/1950 | Strickhouser . |
| 2,699,403 | 1/1955 | Courts ..................................... 427/299 |
| 3,481,756 | 12/1969 | Kong . |
| 3,758,284 | 9/1973 | Haller . |
| 3,950,588 | 4/1976 | McDougal . |
| 4,263,371 | 4/1981 | Franz . |
| 4,276,350 | 6/1981 | Franz . |
| 4,301,197 | 11/1981 | Franz et al. . |
| 4,381,204 | 4/1983 | Erickson . |
| 4,529,657 | 7/1985 | Franz . |
| 4,617,057 | 10/1986 | Plueddemann . |
| 4,724,022 | 2/1988 | Armstrong . |
| 4,879,345 | 11/1989 | Connelly et al. . |
| 4,983,459 | 1/1991 | Franz et al. . |
| 4,997,684 | 3/1991 | Franz et al. . |
| 5,221,371 | 6/1993 | Miller . |
| 5,308,705 | 5/1994 | Franz et al. . |
| 5,314,731 | 5/1994 | Yoneda et al. . |
| 5,328,768 | 7/1994 | Goodwin . |
| 5,368,892 | 11/1994 | Berquier . |
| 5,413,865 | 5/1995 | Nakamura et al. . |
| 5,421,866 | 6/1995 | Stark-Kasley et al. . |
| 5,424,130 | 6/1995 | Nakanishi et al. . |
| 5,425,804 | 6/1995 | Shinohara et al. . |
| 5,523,161 | 6/1996 | Goodwin . |
| 5,523,162 | 6/1996 | Franz et al. . |
| 5,707,740 | 1/1998 | Goodwin ................................. 428/421 |

FOREIGN PATENT DOCUMENTS

| | | |
|---|---|---|
| 0 166 363 | 1/1986 | European Pat. Off. . |
| 0 339 583 | 11/1989 | European Pat. Off. . |
| 0 476 510 | 3/1992 | European Pat. Off. . |
| 0 513 690 | 11/1992 | European Pat. Off. . |
| 0 513 727 | 11/1992 | European Pat. Off. . |
| 0 545 201 | 6/1993 | European Pat. Off. . |
| 0 548 775 | 6/1993 | European Pat. Off. . |
| 0 678 521 | 10/1995 | European Pat. Off. . |
| 0 696 627 | 2/1996 | European Pat. Off. . |
| 0 719 743 | 7/1996 | European Pat. Off. . |
| 0 492 545 | 7/1997 | European Pat. Off. . |
| 1139874 | 7/1957 | France . |
| 1166259 | 11/1958 | France . |
| 1498087 | 10/1967 | France . |
| 2074295 | 10/1971 | France . |
| 1596873 | 8/1970 | Germany . |
| 3701654 | 7/1987 | Germany . |
| 4218657 | 12/1992 | Germany . |
| 58-172244 | 10/1983 | Japan . |
| 58-172245 | 10/1983 | Japan . |
| 58-211701 | 12/1983 | Japan . |
| 59-222272 | 12/1984 | Japan . |
| 61-278574 | 12/1986 | Japan . |
| 1-95181 | 4/1989 | Japan . |
| 89-154533 | 4/1989 | Japan . |
| 62-252120 | 7/1989 | Japan . |
| 1-275674 | 11/1989 | Japan . |
| 2/311332 | 12/1990 | Japan . |
| 05024886 | 2/1993 | Japan . |
| 353911 | 7/1931 | United Kingdom . |
| 965790 | 8/1964 | United Kingdom . |
| 2230260 | 10/1990 | United Kingdom . |
| 95/04608 | 2/1995 | WIPO . |

OTHER PUBLICATIONS

Miall & Sharp, "A New Dictionary of Chemistry", 4th edition, p. 440.
John Wiley & Sons, NY; "Encyclopedia of Polymer Science and Engineering", vol. 16, pp. 533–534 (1989).
European Search Report and Communication for European Application No. EP 96107844, dated Aug. 22, 1996.
European Search Report and Communication for European Application No. EP 96107845, dated Aug. 22, 1996.
European Search Report and Communication for European Application No. EP 96108846, dated Oct. 8, 1997.

*Primary Examiner*—Melvyn I. Marquis
*Attorney, Agent, or Firm*—Kenneth J. Stachel

[57] ABSTRACT

The present invention relates to improving the durability of water repellent films and a method for providing the film on a substrate. The water repellent film is preferably formed over the substrate by applying a water repellent composition Over the substrate which will form the water repellent film. The durability of the water repellency of the film is improved by activating the substrate with an acid prior to forming the water repellent film over the substrate.

24 Claims, No Drawings

WATER REPELLENT SURFACE TREATMENT WITH ACID ACTIVATION

CROSS REFERENCE TO RELATED APPLICATION

This application divisional application of U.S. application Ser. No. 08/660,352 filed Jun. 7, 1996, now U.S. Pat. No. 5,707,740, which is a continuation-in-part of U.S. application Ser. No. 08/461,464 filed Jun. 5, 1995, abandoned, which is a continuation-in-part of U.S. application Ser. No. 08/363,803 filed Dec. 27, 1994, now U.S. Pat. No. 5,523, 161, which is a continuation-in-part of U.S. application Ser. No. 08/220,353 filed Mar. 30, 1994, now abandoned, which is a continuation-in-part of U.S. application Ser. No. 07/589, 235 filed Sep. 28, 1990, now U.S. Pat. No. 5,308,705, which is a continuation-in-part of U.S. application Ser. No. 07/503, 587 filed Apr. 3, 1990, now U.S. Pat. No. 4,983,459.

BACKGROUND

1. Field of the Invention

The present invention relates generally to the art of producing a water repellent film on various substrates, and more particularly, to improving the durability of water repellent films by activating the substrate with an acid solution prior to applying the film.

2. Relevant Art

U.S. Pat. No. 4,997,684 to Franz et al. discloses a method for providing a durable nonwetting surface on glass by contacting the glass with a perfluoroalkylalkyl silane and a fluorinated olefin compound and heating the glass to produce a durable non-wetting surface.

U.S. Pat. No. 5,328,768 to Goodwin discloses a technique for producing a durable non-wetting surface on a glass substrate wherein the surface of the substrate is treated with a silica primer layer and a perfluoroalkylalkyl silane over the primer layer. The silica primer layer improves the durability of the water repellency of the surface. The glass substrate is cleaned with a water and 50/50 by volume isopropanol/water solution prior to application of the primer.

U.S. Pat. No. 5,523,162 to Franz et al. discloses a method for producing a durable non-wetting surface on a plastic substrate which includes treating the plastic substrate with a silica primer layer and a perfluoroalkylalkyl silane. The plastic substrate was cleaned with hexane then methanol prior to application of the primer.

While the foregoing U.S. patents and pending U.S. application disclose durable water repellent films, it can be appreciated by those skilled in the art that making available additional technology to improve the durability of the water repellent surface is advantageous and desirable.

SUMMARY OF THE INVENTION

The present invention relates to a method of improving the durability of water repellent films. The water repellent film used in the practice of the invention is preferably a water repellent composition applied over the substrate, which forms the water repellent film. In the practice of the invention, the durability of the water repellency of the film is improved by activating the substrate with an acid solution prior to applying the water repellent composition to the substrate.

The acid of the acid solution is preferably hydrochloric acid, sulfuric acid or an organic acid such as tartaric acid. Other acids disclosed herein may also be used in the practice of the invention.

Although not limiting to the invention, the substrate includes glass, metal, plastic, enamels and ceramics. The substrate may be coated or uncoated e.g. the substrate may be coated with one or more inorganic oxide films.

DESCRIPTION OF THE INVENTION

The instant invention relates to a method of improving the durability of a water repellent film; the water repellent film is provided by the application of a water repellent composition over a substrate to form the water repellent film on the substrate. The durability of the water repellent film is improved by activating the substrate with an acid solution prior to applying the water repellent composition. Unless otherwise stated or otherwise clear from the context of the discussion, it is to be understood that while the foregoing and following discussions describe the water repellent composition and acid solution as being applied to the substrate itself, it is primarily the surface of the substrate which is affected by the present invention. Also, unless otherwise stated or otherwise clear from the context of the discussion, the term water repellent composition as used herein includes: water repellent compositions applied over the substrate directly as described in U.S. Pat. No. 4,983,459; water repellent compositions having an integral primer as described in U.S. Pat. No. 5,523,161; water repellent compositions having a fluorinated olefin compound, as described in U.S. Pat. No. 5,308,705; or water repellent compositions applied over a discrete primer layer applied to the substrate as described in U.S. Pat. No. 5,328,768.

I. The Substrate:

The instant invention is not limited to any particular substrate surface and may include uncoated glass, metal, plastic, enamel or ceramic substrates. Further, the method of the instant invention may be practiced on coating films or the outermost film of a stack of coating films, including inorganic oxide coating films on glass, metal, plastic, enamel and ceramic substrates. For example, inorganic oxide coatings for glass include but are not limited to antimony-tin oxide, doped tin oxide, or transition metal oxides.

The method of the instant invention is also applicable to plastic substrates with a polysiloxane-based hard coating. These coatings of the polysiloxane sol-gel type generally contain siloxanes and inorganic oxides which function as a suitable substrate for the deposition of a hydrophobic coating, the durability of which is enhanced by the use of a primer.

Metal substrates include galvanized steel, stainless steel and aluminum. Where the substrate may be thermally or chemically treated e.g. to increase its structural properties, the glass may be annealed or tempered by chemical or thermal means.

In the following discussion reference may be made to substrate and substrate surface, where reference to substrate is made unless indicated otherwise, the reference to the substrate refers to the substrate surface which may be uncoated or coated with one or more films.

II. Optional Polishing Operation:

It has been determined that the durability of the water repellency of the water repellent film is extended by the method of the present invention regardless of whether the substrate surface is polished prior to acid activation. Although not required, the step of polishing prior to acid activation is recommended.

The polishing step provides two benefits. The first is it roughens the substrate surface. The second is to partially remove contaminating residues from the substrate surface. Atomic Force Microscopy data has shown that the polishing of glass substrates has increased the mean roughness of the glass surface from about 0.5 nanometers to about 4 nanometers (measured over a 100 square micron area). Fine surface scratches up to 10 nanometers deep in the glass substrate have not resulted in any measurable haze. This provides more glass surface area for subsequent reaction with water repellent composition. Decontamination of the substrate surface can be shown by the contact angle of a drop of water on a freshly polished surface; the lower the contact angle the cleaner the substrate surface. As will be observed from the following data, polishing does not significantly improve the durability of the water repellent film. However, the polishing is recommended to produce a more clean surface on the substrate prior to acid activation.

The polishing compounds that may be used in the practice of the present invention include but are not limited to alumina, ceria, iron oxide, garnet, zirconia, silica, silicon carbide, chromic oxide, diamond, or other hard material with sufficiently small particle size as to not damage the substrate. Mixtures of these materials are suitable polishing compounds. Preferred polishing compounds include alumina or ceria.

The polishing operation is performed by wiping the substrate with a pad containing a slurry of the polishing compound. The preferred concentration of the polishing compound in water to form a polishing slurry is in the range of 5 to 30 weight percent. Lower and higher concentrations may be used but more or less slurry or more or less contact time with the substrate may be required to properly polish the substrate. The preferred polishing process includes wiping the substrate with the polishing slurry until the slurry no longer pulls away from any part of the substrate surface. Where the slurry pulls away from a part of the substrate surface, it typically does so because the slurry's cohesive forces are greater than the adhesive force of the slurry to the substrate. Adhesive forces of the slurry to the substrate increase as a result of the removal of surface impurities from the substrate. The polishing operation removes such impurities causing the adhesive force of the slurry to the substrate to exceed the cohesive force of the slurry where upon the slurry no longer pulls away from any part of the substrate. The polishing operation may be performed by hand or by using powered equipment such as an orbital sander with a non-abrasive pad which is wet with the polishing slurry.

III. The Water Repellent Composition:

The water repellent composition that may be used in the practice of the present invention preferably includes a perfluoroalkylalkyl silane as disclosed in the cross-referenced related applications and in U.S. Pat. Nos. 4,997,684; 5,328,768 and 5,523,162, each of which is hereby incorporated by reference. Perfluoroalkylalkyl silanes that are preferred in the practice of the invention have the general formula $R_m R'_n SiX_{4-m-n}$, wherein R is a perfluoroalkylalkyl radical; m is 1, 2 or 3; n is 0, 1 or 2; and m+n is less than 4; R' is a vinyl or an alkyl radical, preferably methyl, ethyl, vinyl or propyl; and X is preferably a radical such as halogen, acyloxy, and/or alkoxy. Preferred perfluoroalkyl moieties in the perfluoroalkylalkyl radicals range from $CF_3$ to $C_{30}F_{61}$, preferably $C_6F_{13}$ to $C_{18}F_{37}$, and most preferably $C_8F_{17}$ to $C_{12}F_{25}$; the second alkyl moiety of the perfluoroalkylalkyl is preferably a substituted ethyl. R' is more preferably methyl or ethyl. Preferred radicals for X include hydrolyzable chloro, bromo, iodo, methoxy, ethoxy and acetoxy radicals.

Preferred perfluoroalkylalkyl silanes in accordance with the present invention include perfluoroalkylethyltrichlorosilane, perfluoroalkylethyltrimethoxysilane, perfluoroalkylethyltriacetoxysilane, perfluoroalkylethyldichloro(methyl)silane and perfluoroalkylethyldiethoxy-(methyl)silane.

IIIA. The Primer Layer or Integral Primer:

The water repellent film that may be used in the practice of the present invention may include a discrete primer layer interposed between the substrate and the water repellent film, as disclosed in one or more of the cross-referenced related applications and U.S. Pat. No. 5,328,768 and U.S. Pat. No. 5,523,162. Where a discrete primer layer is selected, the primer layer is first applied over the substrate prepared in accordance to the invention by application methods including pyrolytic deposition, magnetron sputtering or sol-gel condensation reactions. The water repellent composition is then applied over the primer layer. The primer layer, not limiting to the invention, may include a silica primer layer.

Alternatively, the water repellent film that may be used in the practice of the present invention may include an integral primer which is included in the water repellent composition, also as disclosed in one or more of the cross-referenced related applications and U.S. Pat. No. 5,523,161. The integral primer, not limiting to the invention, may be a hydrolyzable silane or siloxane capable of hydrolytic condensation to form silica gel which functions as the integral primer.

Suitable silanes capable of hydrolysis to silica gel have the general formula $SiX_4$ wherein X is a hydrolyzable radical generally selected from the group of halogens, alkoxy and acyloxy radicals. Preferred silanes are those wherein X is preferably chloro, bromo, iodo, methoxy, ethoxy and acetoxy. Preferred hydrolyzable silanes include tetrachlorosilane, tetramethoxysilane and tetraacetoxysilane.

Suitable siloxanes have the general formula $Si_y O_z X_{4y-2z}$, wherein X is selected from the group of halogen, alkoxy and acyloxy radicals, y is two or more, and z is one or more and $4y-2z$ is greater than zero. Preferred hydrolyzable siloxanes include hexachlorodisiloxane, octachlorotrisiloxane, and higher oligomer chlorosiloxanes.

Where the integral primer layer is selected, the water repellent composition is applied to the substrate prepared in accordance to the invention preferably as a solution in an aprotic solvent, preferably an alkane or mixture of alkanes, or a fluorinated solvent. Such solutions may be applied to the substrate by any conventional technique such as dipping, flowing, wiping or spraying without the additional step of applying a separate primer layer.

IIIB. The Fluorinated Olefin Compound:

The water repellent composition that may be used in the practice of the present invention may also optionally include a fluorinated olefin compound also as disclosed in the cross-referenced related applications and U.S. Pat. Nos. 4,997,684; 5,328,768 and 5,523,162 to provide lubricity to promote dirt repellency of the water repellent surface. A preferred olefin compound is selected from the group represented by the general formula $C_m F_{2m+1} CH = CH_2$, where m is from 1 to 30, preferably 1 to 16, more preferably 4 to 10.

IV. The Acid Activation of the Present Invention:

The acid solutions used in the practice of the present invention are selected upon their ability to increase the durability of the water repellency of the substrate without damaging the substrate. Although not limiting to the invention, acid solutions that are preferably used in the practice of the invention include solutions of hydrochloric acid, sulfuric acid and organic acids. Where organic acid solutions are selected, strong organic acid solutions are preferred, which includes acid solutions having a pH of less than about 5 and most preferably less than about 3. Other acids that may be used in the practice of the invention include phosphoric acid, hydrobromic acid, nitric acid, acetic acid, trifluoroacetic acid, and/or citric acid.

Where the acid is hydrochloric acid, an acid solution of hydrochloric acid dissolved in deionized water where the acid concentration is in the range of 0.5–30 wt % hydrochloric acid, in a balance of deionized water, may be used, 0.5–20 wt % is acceptable, and 0.5–10 wt % is preferred. Where the acid is sulfuric acid, an acid solution of sulfuric acid dissolved in deionized water where the acid concentration is in the range of 0.5–30 wt % sulfuric acid dissolved in the balance of deionized water may be used, 0.5–20 wt % is acceptable, and 0.5–10 wt % is preferred. Where the acid is tartaric acid, an acid solution of tartaric acid dissolved in deionized water where the acid concentration is in the range of 1–40 wt % tartaric acid dissolved in the balance of deionized water may be used and 2–20 wt % is preferred. As can be appreciated, lower and higher acid concentrations are acceptable, however using such concentrations may require correspondingly more or less activating time on the substrate to improve the durability of the water repellent film.

The acid activation of the substrate is accomplished by applying the acid solution to the substrate by any conventional technique such as dipping, flowing, spraying and, preferably, wiping. While no set number of wipes are required, it has been found that wiping the substrate about six times provides acceptable results. Wiping is commonly done by applying moderate hand pressure to an absorbent acid-resistant pad containing the acid solution, such as a cotton pad.

Where the acid solution is volatile and will evaporate from the substrate without leaving a residue, the acid is applied to the substrate, allowed to evaporate, whereupon the water repellent composition is applied over the substrate. Volatile acid solutions are defined herein as those which are capable of volatilizing at ambient conditions within a short time period (i.e. within about 10 minutes or less) after application to the substrate. Examples of volatile acid solutions that may be used in the practice of the present invention include hydrochloric, hydrobromic, acetic, nitric, and trifluoroacetic acid solutions.

Where the acid solution is non-volatile, or is volatile but leaves behind a residue upon evaporation, the substrate should be rinsed after the acid activation step to remove the acid solution or its residue. After rinsing, the substrate is dried and the water repellent composition applied over the substrate. Non-volatile acid solutions are defined herein as those which are not capable of volatilizing at ambient conditions within a short time period (i.e. within about 10 minutes or less) after application to the substrate. Examples of non-volatile acids include sulfuric, tartaric, citric, and phosphoric acids. The rinsing solutions may include water or alcohol with water being preferred.

It is believed that during the acid activation step the acid solution increases the durability of the water repellent surface by removing contaminating materials from the surface of the substrate and increasing the number of bonding sites on the surface of the substrate available for reaction with the water repellent composition.

V. Durability Testing of The Water Repellent Film:

Durability of the water repellent film applied in accordance with the present invention is measured in terms of the ability of the film surface to maintain a contact angle over time under accelerated weathering conditions. The higher the degree of contact angle that can be maintained by the sample tested over time or number of wiping cycles, the more durable the film and the greater the surface repels water.

The contact angles recited herein are measured by the sessile drop method using a modified captive bubble indicator manufactured by Lord Manufacturing, Inc., equipped with Gaertner Scientific goniometer optics. The surface to be measured is placed in a horizontal position, facing upward, in front of a light source. A sessile drop of water is placed on top of the surface in front of the light source so that the profile of the sessile drop can be viewed and the contact angle measured in degrees through the goniometer telescope equipped with circular protractor graduation.

Simulated weathering of the water repellent film is obtained via weathering chambers which include the Cleveland Condensing Cabinet (CCC) and QUV Tester (products of The Q-Panel Company, Cleveland, Ohio). The CCC chamber was operated at a vapor temperature of 140° F. (60° C.) in an indoor ambient environment which resulted in constant water condensation on the test surface. The QUV Tester was operated with cycles of 8 hours UV (B313 lamps) at black panel temperature of 65–70° C. and 4 hours condensing humidity at 50° C. atmosphere temperature.

The abrasion resistance of the water repellent film was measured by the Taber Abrasion Test utilizing the Taber Abraser manufactured by Teledyne Taber of North Tonawanda, N.Y. The Taber Abrasion Test consists of rotating a substrate to be tested in a horizontal orientation while a pair of abrading wheels rotate on the surface. One revolution of the substrate equals one cycle. The weight per wheel can be varied to increase or decrease the rate of abrasion, and for the testing of the present invention, 500 gram of weight per wheel was applied. After abrasion, the water repellency was measured in the abraded track with the sessile water drop method previously described.

The abrasion resistance of the water repellent film was measured by the Wet Sled Abrasion Test. In this test, two wiper blades are cycled across the surface of the water repellent film while water or an abrasive slurry is applied in front of the wiper blades. A wiped area of about 1.5 inches (3.8 cm) by 7.5 inches (19.05 cm) is abraded by each wiper during this test with the result that two such areas are typically abraded on the substrate in side-by-side orientation. The blades are typically cycled for 5000 cycles which result in 20,000 wiper strokes across each abraded area. After abrasion the water repellency of the water repellent film is measured by the sessile water drop method.

The present invention will be further understood from the descriptions of specific examples which follow. In the following examples, glass coupons were cut from a piece of glass cut from a float glass ribbon formed on a molten bath of tin. All polishing, activating and coating procedures described in the following examples were performed on the tin side of the coupons.

EXAMPLE 1

Example 1 shows a comparison between the durability of a water repellent film formed on a set of glass coupons that were activated by an acid solution of hydrochloric acid in accordance with the invention, hereinafter "acid activated" and the durability of a water repellent film formed on a different set of glass coupons that were not activated by an acid solution of the invention. The two sets of glass coupons were each subdivided into four subsets. Each acid activated subset was paired with a non-acid activated subset, and the four pairs of coupon subsets were then subjected to either the CCC, QUV, Wet Sled Abrasion or Taber Abrasion testing methods. More specifically, sixteen glass coupons of clear uncoated float glass measuring 2×6×0.182 inch (5.08× 15.24×0.462 cm) were used for the CCC test, 3×4×0.182 inch (7.62×10.16×0.462 cm) for the QUV test, 4×16×0.090 inch (10.16×40.64×0.23 cm) for the Wet Sled Abrasion test, and 4×4×0.090 inch (10.16×10.16×0.23 cm) for Taber Abrasion test were subjected to a heat treatment which simulates the heat cycles used in bending processes. This heat treatment consisted of subjecting the glass coupons for approximately 15 minutes to a temperature of 525 to 560° C. in an electric furnace. After heat treatment the glass coupons were allowed to slowly cool in air to ambient conditions.

After cooling, the 16 glass coupons were polished by hand with a cerium oxide slurry to remove surface impurities. The cerium oxide slurry was formed by mixing a commercially available cerium oxide polishing powder with water to a concentration of roughly 20 wt % cerium oxide with balance water. Commercially available cerium oxide polishing powders include Rhodite 19A (3.2 micron average particle size) and Rhodox 76 (3.1 micron average particle size), both of which are listed as 50% cerium oxide, 90% rare earth oxide purity; and are supplied by Universal Photonics, Inc. of Hicksville, N.Y. The cerium oxide slurry was applied to the glass coupons with a pad. Polishing was continued until the slurry no is longer pulled away from any portion of the glass coupon. After polishing, the 16 glass coupons were cleaned with deionized water to remove any residue from the polishing pad or the polish, and dried with a paper towel.

The 16 coupons were divided into two groups, designated for discussion purposes as Group A including eight glass coupons and Group B including eight coupons.

The glass coupons of Group A were subjected to an acid activation with 1 Normal (approximately 3.7 wt %) hydrochloric acid solution. The acid solution was applied by hand using an absorbent pad for 60 seconds. The glass coupons of Group B were not subjected to acid activation.

The glass coupons of Groups A and B were then treated twice with a solution of 0.8 wt % silicon tetrachloride in Fluorinert® FC-77 (hereinafter "FC-77"), a perfluorocarbon/perfluoroether solvent product of 3M Corporation of St. Paul, Minn. The silicon tetrachloride solution was applied to the glass coupons with an absorbent pad to form a silica primer layer on the glass coupons of Groups A and B.

The coupons of Groups A and B were then treated once with a solution of: 1) 2.5 wt % perfluoroalkylethyltrichlorosilane (perfluoroalkyl moieties comprised primarily $C_6F_{13}$ to $C_{18}F_{37}$); and 2) 2.5 wt % perfluoroalkylethylene (perfluoroalkyl moieties comprised primarily $C_6F_{13}$ to $C_{18}F_{37}$) in FC-77 to deposit a perfluoroalkylalkyl silane water repellent composition on the glass coupons. The coupons of Groups A and B were heated at 150° F. (65.5° C.) for about 10 hours to cure the coating and produce a water repellent film on the glass coupons. Excess silanes were removed from the glass surfaces by solvent washing. The solvent washing was conducted with PF-5060 (a perfluorohexane product of 3M Corporation). The coupons were washed with the solvent by wiping with paper towel until visually clean.

The glass coupons of Group A were then further divided into four subsets or groups, identified for discussion purposes as Groups A1 (2 coupons), A2 (2 coupons), A3 (2 coupons) and A4 (2 coupons). The glass coupons of Group B were similarly divided into Groups B1 (2 coupons), B2 (2 coupons), B3 (2 coupons) and B4 (2 coupons).

The Group A1 and B1 glass coupons were then weathered in the CCC weathering cabinet as described above. One coupon from Group B1 broke during sample preparation and was remade prior to testing. This resulted in this coupon (and only this coupon) receiving 16 hours less CCC exposure time than is indicated in the table below for the remaining coupons.

The Group A2 and B2 glass coupons were weathered in the QUV-B313 weathering cabinet as described above.

The Group A3 and B3 glass coupons were subjected to the Wet Sled Abrasion Test. In the present example, the four coupons of Groups A3 and B3 resulted in the formation of eight separate abraded areas. One of the abraded areas on each of the four coupons of Group A3 and Group B3 was abraded for 200 cycles with a slurry of 0.5 wt % precipitated silica in water. One coupon from Group A3 and one coupon from Group B3 were then selected and the remaining abrasion area of each of these coupons was abraded for 600 cycles with the same slurry. The abrasion area of the remaining coupon of Group A3 and the remaining coupon of Group B3 not previously selected was then subjected to a 5000 cycle test using deionized water instead of the slurry.

The Group A4 and B4 glass coupons were subjected to the Taber Abrasion Test.

For all of the glass coupons tested in Groups A1–A4 and B1–B4, the water repellent film's water repellency efficiency was determined by measuring the contact angle of a sessile drop of water placed upon the sample using the modified captive bubble indicator manufactured by Lord Manufacturing, Inc., as described above. The coupons in Groups A1–A4 and B1–B4 were tested in duplicate. The sessile drop contact angles were measured for both glass coupons, and the results were averaged. The averaged results are shown in the following tables:

TABLE 1

CCC

Contact Angle (°)

| Hours | Group B1 w/o Acid | Group A1 With Acid |
|---|---|---|
| 0 | 121 | 125 |
| 350 | 107 | 118 |
| 658 | 90 | 113 |
| 991 | 78 | 111 |
| 1494 | 59 | 101 |
| 1996 | 59 | 73 |
| 2640 | | 59 |

TABLE 2

QUV-B313

Contact Angle (°)

| Hours | Group B2 w/o Acid | Group A2 With Acid |
|---|---|---|
| 0 | 123 | 123 |
| 352 | 116 | 115 |
| 659 | 111 | 110 |
| 994 | 106 | 108 |
| 1661 | 100 | 96 |
| 2324 | 94 | 94 |
| 2966 | 93 | 90 |

TABLE 3

Wet Sled

| | Contact Angle (°) | |
|---|---|---|
| Cycles | Group B3 w/o Acid | Group A3 With Acid |
| 0 | 124 | 123 |
| 200 | 112 | 111 |
| 600 | 112 | 112 |
| 5000 | 42 | 97 |

TABLE 4

Taber Abraser

| | Contact Angle (°) | |
|---|---|---|
| Cycles | Group B4 w/o Acid | Group A4 With Acid |
| 0 | 122 | 124 |
| 50 | 105 | 110 |
| 150 | 75 | 83 |

As can be seen from Table 1, under the CCC weathering test, the acid activated Group A1 glass coupons maintained a contact angle of 101 degrees at 1494 hours, whereas the Group B1 glass coupons maintained only a 59 degree contact angle, showing a very substantial improvement in the durability and water repellency efficiency of the acid activated glass coupons over the non-acid activated glass coupons. The Group B1 coupons were not tested farther than the 1996 hours CCC duration. Common test procedure calls for discontinuing the test after the contact angle either falls below 60° or 3000 hours of test is reached. This procedure was generally followed for the data shown in all Tables 1–7.

As may be seen in Table 3, under the Wet Sled Abrasion Test, at 5000 cycles, the acid activated Group A3 glass coupons maintained a contact angle of 97 degrees which far exceeded the 42 degree contact angle of the Group B3 non-acid activated glass coupons, again showing a very substantial improvement in the durability and water repellency efficiency of the acid activated glass coupons over the non-acid activated glass coupons.

Similarly, as may be seen in Table 4, under the Taber Abrasion Test, the contact angle after 150 cycles of the acid activated Group A4 glass coupons was 83 degrees whereas the non-acid activated Group B4 glass coupons maintained only a 75 degree contact angle.

Differences in the QUV-B313 data of Table 2 do not show the substantial improvement obtained by the other tests, but the differences in contact angles are considered to be within normal measurement variations and are not considered to indicate less durability of the water repellent film within the context of that particular testing method.

EXAMPLE 2

Example 2 shows a comparison between the durability of a water repellent film formed on a first set of glass coupons which were not acid activated; a second set of glass coupons acid activated with a hydrochloric acid solution; a third set of glass coupons acid activated with a sulfuric acid solution; and a fourth set of glass coupons acid activated with a tartaric acid solution. The four sets of glass coupons were tested utilizing the CCC Weathering Chamber as described above.

Twelve glass coupons of 0.182 inch (0.462 cm) thick clear uncoated float glass measuring 2 inches (5.08 cm) in width and 6 inches (15.24 cm) in length were subjected to the same heat treatment as described in Example 1.

The glass coupons were polished using an orbital sander with polyester felt pad with an aluminum oxide slurry to remove impurities. The aluminum oxide slurry was formed by mixing Microgrit® WCA1T (Microgrit is a registered trademark of the Micro Abrasives Corp., Westfield, Mass.) with water in a concentration of approximately 20 wt %. The polishing compound was applied to the glass coupons using the felt pad and an orbital sander until the slurry no longer pulled away from any portion of the glass coupon. After polishing, the glass coupons were cleaned with deionized water and paper towels as in Example 1.

The 12 coupons were then divided into four groups, designated for purposes of discussion as Groups C, D, E and F, with three coupons in each group.

The coupons in Group C were not acid activated. The glass coupons in Group D were acid activated with a 1 Normal (approximately 3.7 wt %) hydrochloric acid solution. The glass coupons in Group E were acid activated with a 1 Normal (approximately 4.8 wt %) sulfuric acid solution. The glass coupons in Group F were acid activated with a 10 wt % tartaric acid solution. The acid solutions were applied to the glass coupons by wiping with a cotton pad for 15–30 seconds. The glass coupons of Groups D, E and F were then washed with deionized water and paper towels.

The glass coupons of Groups C, D, E and F were then each treated twice with a solution of 0.8 wt % silicon tetrachloride in FC-77 on an absorbent pad to form a silica primer layer on the glass coupons.

The glass coupons of Groups C, D, E and F were then treated three times each with a solution of: 1) 2.5 wt % perfluoroalkylethyltrichlorosilanes (perfluoroalkyl moieties comprised primarily $C_6Fl_3$ to $C_{18}F_{37}$) ; and 2) 2.5 wt % perfluoroalkylethylene (perfluoroalkyl moieties comprised primarily $C_6Fl_3$ to $C_{18}F_{37}$) in FC-77 to deposit a perfluoroalkylalkyl silane water repellent composition on the glass coupons. The glass coupons of Groups C, D, E and F were then cured at 150° F. (65.6° C.) for 8 hours to cure the coating and produce a water repellent film on the glass coupons. Excess silanes were removed from the glass coupons by solvent washing. The solvent washing was conduct with PF-5060 and the coupons were washed with the solvent by wiping with a paper towel until visually clean.

The glass coupons of Groups C, D, E and F were weathered in the CCC weathering cabinet as described above. The water repellent film's water repellency efficiency was determined by measuring the contact angle of a sessile drop of water as described in Example 1. Each of the coupons in Groups C, D, E and F were prepared in triplicate, and the contact angles from each group were averaged. The averaged results are shown in the following table:

TABLE 5

CCC

| | Contact Angle (°) | | | |
|---|---|---|---|---|
| Hours | Group C w/o Acid | Group D HCl | Group E $H_2SO_4$ | Group F Tartaric |
| 0 | 114 | 118 | 119 | 120 |
| 142 | 111 | 116 | 118 | 118 |
| 312 | 87 | 119 | 120 | 120 |

TABLE 5-continued

| | CCC | | | |
|---|---|---|---|---|
| | Contact Angle (°) | | | |
| Hours | Group C w/o Acid | Group D HCl | Group E $H_2SO_4$ | Group F Tartaric |
| 620 | 72 | 112 | 112 | 113 |
| 946 | 62 | 94 | 77 | 93 |
| 1278 | 56 | 72 | 63 | 67 |
| 1588 | — | 59 | 55 | 57 |

As may he seen from Table 5, at 1278 hours, the contact angle for the acid activated glass coupons of the Groups D, E and F remained much higher, at 72, 63 and 67 degrees, than the contact angle of the non-acid activated Group C coupons, which maintained only a 56 degree contact angle after weathering.

EXAMPLE 3

Example 3 shows a comparison of the durability of a water repellent film formed on a first set of glass coupons which were not acid activated with the durability of a water repellent film formed on a second set of glass coupons which were acid activated with hydrochloric acid solution and a third set of glass coupons acid activated with a tartaric acid solution. The glass substrate was changed over the previous examples, to show that the superior results of the present invention are obtainable on various glass substrates.

Nine glass coupons measuring 0.119 inch (0.30 cm) thick of a chemically tempered glass sold by PPG Industries, Inc. of Pittsburgh, Pa., HERCULITE® II glass measuring 2 inches (5.08 cm) in width by 6 inches (15.24 cm) in length were selected. Unlike Examples 1 and 2 above, no heat treatment was applied to the glass coupons of Example 3 prior to polishing.

The glass coupons were polished using an orbital sander with polyester felt pad and an aluminum oxide slurry, cleaned with deionized water and paper towel as described in Example 2.

The glass coupons were divided into three groups, designated for purposes of discussion as Groups G, H and I, each group containing 3 coupons. The glass coupons of Group G were not acid activated. The glass coupons of Group H were acid activated with a 1 Normal hydrochloric acid solution as described in the foregoing examples. The glass coupons of Group I were acid activated with a 10 wt % tartaric acid solution as described in the foregoing examples. The acid solutions of Groups H and I were wiped on the coupons for 15–30 seconds. The Group H and I glass coupons were then washed with deionized water as described in the foregoing examples.

The glass coupons of Groups G, H and I were then treated twice each with a solution of 0.8 wt % silicon tetrachloride in FC-77 as described in the foregoing examples to form a silica primer layer on the glass coupons.

The glass coupons of Groups G, H and I were then treated three times each with a solution of: 1) 2.5 wt % perfluoroalkylethyltrichlorosilanes (perfluoroalkyl moieties comprised primarily $C_6F_{13}$ to $C_{18}F_{37}$); and 2) 2.5 wt % perfluoroalkylethylene (perfluoroalkyl moieties comprised primarily $C_6F_{13}$ to $C_{18}F_{37}$) in FC-77 as described in the foregoing examples to deposit a water repellent composition on the glass substrates. The coupons of Groups G, H and I were cured at 150° F. (65.5° C.) for 8 hours to cure the coating and produce water repellent film on the glass coupons, and excess silanes were removed from the glass surfaces by solvent washing with PF-5060 as described in the foregoing examples.

The coupons of Groups G, H and I were weathered in the CCC weathering cabinet as described in the foregoing examples.

The water repellent film's water repellency efficiency of the glass coupons of Groups G, H and I was determined by measuring the contact angle of a sessile drop of water as described in the foregoing examples. While the glass coupons of Groups G, H and I were prepared in triplicate, an HCl-treated coupon of Group H broke prior to weathering. Thus the reported values for the HCl treated glass coupons are averages of duplicate, not triplicate samples. The reported values for Groups G and I are averages of triplicate values. The averaged results are shown in the following table:

TABLE 6

| | CCC | | |
|---|---|---|---|
| | Contact Angle (°) | | |
| Hours | Group G w/o Acid | Group H HCl | Group I Tartaric |
| 0 | 113 | 116 | 116 |
| 185 | 109 | 116 | 109 |
| 332 | 97 | 116 | 97 |
| 658 | 78 | 107 | 97 |
| 985 | 72 | 102 | 86 |
| 1317 | 65 | 100 | 86 |
| 1646 | 63 | 96 | 80 |
| 1976 | 71 | 94 | 84 |
| 2310 | 54 | 89 | 77 |
| 2645 | — | 76 | 65 |
| 2866 | | 72 | 57 |
| 3194 | | 53 | — |

As can be seen from Table 6, at 2310 hours of weathering, the Group G, non acid activated coupons maintained only a 54 degree contact angle, whereas the acid activated coupons of Groups H and I maintained contact angles of 89 and 77 degrees respectively, showing considerably superior water repellency after weathering.

EXAMPLE 4

Example 4 shows a comparison of the durability of a water repellent film formed on a first set of glass coupons which were not acid activated with a second set of glass coupons which were acid activated with a hydrochloric acid solution. In this example, the water repellent composition included an integral primer. Subsets were selected to provide a comparison of polished versus unpolished glass coupons. None of the glass coupons of Example 4 included a heating treatment prior to or after coating the glass coupon with the water repellent composition.

Twelve glass coupons of 0.182 inch (0.46 cm) thick clear uncoated float glass measuring 2 inches (5.08 cm) in width by 6 inches (15.24 cm) in length were selected.

The twelve glass coupons were cleaned with deionized water and a paper towel. The glass coupons were divided into four groups of three coupons each, described herein as Groups J, K, L, and M.

The coupons of Group J were not acid activated or polished.

The coupons of Group K were acid activated with a 1 Normal hydrochloric acid solution as described in the foregoing examples but were riot subjected to a polishing operation. The glass coupons of Group K were then washed with deionized water and dried as described in the foregoing examples.

The coupons of Group L were polished as described in the prior examples with an aluminum oxide slurry as described in previous examples but were not acid activated.

The coupons of Group M were both polished and acid activated. Polishing was performed in the same manner as described with respect to the Group L coupons and acid activated in the same manner as described with respect to the Group K coupons.

The glass coupons of Groups J, K, L and M were then treated with a solution of: 1) 0.5 wt % of perfluoroalkylethyLtrichlorosilane (perfluoroalkyl moieties comprised $C_8F_{17}$) ; and 2) 0.5 wt % silicon tetrachloride in Isopar® L, a hydrocarbon solvent produced by Exxon Corporation of Houston, Tex., to deposit a perfluoroalkylalkyl silane water repellent composition having an integral primer layer on the coupons.

The glass coupons of Groups J, K, L and M were not cured, but were weathered in the CCC weathering cabinet as described in the foregoing examples.

The water repellency of the water repellent film was measured by the contact angle of a sessile drop of water as described in the foregoing examples. Coupons of Groups J, K, L and M were prepared in triplicate and the contact angles from each group were averaged. The averaged results are shown in the following table:

TABLE 7

| | CCC | | | |
| --- | --- | --- | --- | --- |
| | Contact Angle (°) | | | |
| | Unpolished | | Polished | |
| Hours | Group J w/o Acid | Group K HCl | Group L w/o Acid | Group M HCl |
| 0 | 113 | 115 | 111 | 113 |
| 185 | 96 | 113 | 85 | 108 |
| 332 | 82 | 106 | 74 | 100 |
| 494 | 65 | 89 | 61 | 83 |
| 658 | 56 | 75 | 53 | 71 |
| 824 | 47 | 63 | 46 | 64 |
| 985 | — | — | — | 45 |

As shown in Table 7, after 824 hours of weathering, the coupons of Groups J and L, without acid activation, maintained a contact angle of only 47 and 46 degrees respectively, whereas the acid activated coupons of Groups K and M maintained respective contact angles of 63 and 64 degrees. The results clearly demonstrate that the acid activated surface used with a water repellent film having integral primer improves durability of the water repellency of the film. A comparison of the Group K and Group M coupons demonstrate that at. 824 hours, the polishing operation did not significantly affect the contact angle of the Group M coupons.

The above examples are offered to illustrate the present invention. Additional examples were prepared and tested, and the foregoing result is a representative subset of all the prepared examples. Various perfluoroalkylalkyl silanes, hydrolyzable silanes, solvents and concentrations may be applied by any conventional technique, and optionally cured at suitable temperatures for adequate times to provide durable non-wetting surfaces on a variety of substrates.

As can be appreciated, the foregoing disclosure is not limiting to the invention and was presented to provide an s appreciation of the invention. The scope of the present invention is defined by the following claims.

I claim:

1. In a method for producing a water repellent film on a surface, the improvement comprising the steps of:
   exposing the surface to an acid solution to activate the surface; and
   providing a water repellent film over the activated surface.

2. A method for increasing the durability of a water repellent film formed on a surface of a substrate comprising the steps of:
   roughening and removing contaminating residues from a surface of the substrate;
   activating the roughened surface by removing contaminating materials and increasing the number of bonding sites on the surface of the substrate; and
   forming a water repellent film from a water repellent composition having perfluoroalkylalkyl silane over the activated surface.

3. The method of claim 2 wherein said roughening and removing of contaminants comprises the step of polishing the surface with a polishing compound.

4. The method of claim 3 wherein the polishing compound is selected from the group consisting of alumina, ceria, iron oxide, garnet, zirconia, silica, silicon carbide, chromic oxide and diamond.

5. The method of claim 4 wherein said polishing compound is dispersed in water to form a polishing slurry.

6. The method of claim 5 wherein the concentration of the polishing compound in water is in the range of 5 to 30 weight percent.

7. The method of claim 5 wherein the polishing is performed until the polishing slurry does not pull away from a part of the surface.

8. The method of claim 2 wherein said activation step further comprises the step of:
   contacting the surface of the substrate with an acid solution;
   removing the acid solution from the surface of the substrate to provide a surface that is free of said acid solution and residue of said acid solution; and thereafter
   forming the water repellent film on the acid-contacted surface of the substrate.

9. The method of claim 8 wherein the acid is selected from the group consisting of solutions of hydrochloric acid, sulfuric acid, tartaric acid, phosphoric acid, hydrobromic acid, nitric acid, acetic acid, trifluoroacetic acid and citric acid.

10. The method of claim 2 wherein said forming step comprises the step of applying a water repellent composition comprising a perfluoroalkylalkyl silane over the acid-contacted surface of the substrate.

11. The method of claim 10 wherein said perfluoroalkyl alkyl silane is selected from the compounds having the general formula $R_m R'_n SiX_{4-m-n}$, wherein R is a perfluoroalkyl radical, m is 1, 2 or 3, n is 0, 1, or 2, and m+n is less than 4, R' is selected from the group consisting of vinyl and alkyl radicals, and x is a radical selected from the group consisting of halogen, acyloxy, alkoxy radicals and mixtures thereof.

12. The method of claim 11 wherein R' is selected from the group consisting of methyl, ethyl, and propyl radicals, X is selected from the group consisting of chloro, bromo, iodo, methoxy, ethoxy, and acetoxy radicals, and said perfluoroalkylalkyl radical comprises a perfluoroalkyl moiety of the formula $CF_3$ to $C_{30}F_{61}$.

13. The method of claim 10 wherein said forming step includes the step of adhering the water repellent film from the water repellent composition to the surface with a primer.

14. The method of claim 13 wherein said primer comprises silica.

15. The method of claim 13 wherein said primer is integral with said water repellent composition.

16. The method of claim 15 wherein said water repellent composition comprises a mixture of perfluoroalkylalkyl silane and a compound selected from the group consisting of silanes and siloxanes capable of hydrolytic condensation to form a silica gel which functions as said integral primer.

17. The method of claim 10 wherein said water repellent composition further comprises a fluorinated olefin compound.

18. The method of claim 17 wherein the fluorinated olefin compound is selected from the group of compounds having the general formula $C_mF_{2m+1}CH{=}CH_2$, where m is an integer from 1 to 30.

19. The method of claim 2 wherein the substrate is selected from the group consisting of glass substrates, plastic substrates, enamel substrates, ceramic substrates and metal substrates and mixtures thereof.

20. The method of claim 2 wherein the roughening and removal of contaminating residues is partial removal of the contaminating residue.

21. The method of claim 2 wherein said activation step further comprises the steps of:

contacting the surface of the substrate with a volatile acid solution;

allowing the volatile acid to evaporate, and forming the water repellent film on the acid-contacted surface of the substrate.

22. A method for increasing the durability of a water repellent film formed on a surface of a substrate comprising the steps of:

roughening ard removing contaminating residues from a surface of the substrate;

acid activating the roughened surface; and forming a water repellent film from a water repellent composition over the activated surface.

23. The method of claim 22 wherein the roughening and removing step is polishing.

24. The method of claim 19 wherein the substrate is selected from coated substrates with films, and the outermost film of a stack of coating films.

* * * * *